May 3, 1927.  
P. PESTOURIE  
SHOCK ABSORBER  
Filed Dec. 7, 1925

1,626,755

2 Sheets-Sheet 1

P. Pestourie  
Inventor  
By: Marks & Clark  
Attys

May 3, 1927. 1,626,755
P. PESTOURIE
SHOCK ABSORBER
Filed Dec. 7, 1925 2 Sheets-Sheet 2

P. Pestourie
Inventor

By: Marks & Clerk
Attys

Patented May 3, 1927.

1,626,755

UNITED STATES PATENT OFFICE.

PIERRE PESTOURIE, OF PARIS, FRANCE.

SHOCK ABSORBER.

Application filed December 7, 1925, Serial No. 73,795, and in France December 17, 1924.

The present invention relates to a shock absorber for elastic suspensions wherein I obtain the progressive braking of the oscillations in both directions, thus affording a much more effective damping than the devices for constant braking in current use.

In the form of construction to be hereinafter described, the shock absorber comprises a cylindrical casing which is suitably faced in the interior and is secured to a lever which is pivoted for instance to the vehicle axle; the said casing is rotatable on a hub which is secured for instance to the vehicle frame and is composed of a stationary half-ring and a radially movable half-ring; this latter forms a braking segment or shoe and is acted upon by a spring which abuts at one end against the said ring and at the other end against the casing at a diametrically opposite point. The half-ring serves to center the said casing and also to prevent the movable segment, whose ends are in mutual contact, from all circular motion due to the casing. When the said lever is displaced from its position of equilibrium, for which the spring is so regulated that no braking will result, the casing will bring the contact points of the spring closer together, thus producing an increasing pressure on the segment and an increasing braking effect which may attain the maximum.

The appended drawing shows by way of example various embodiments of the invention.

Figure 1:
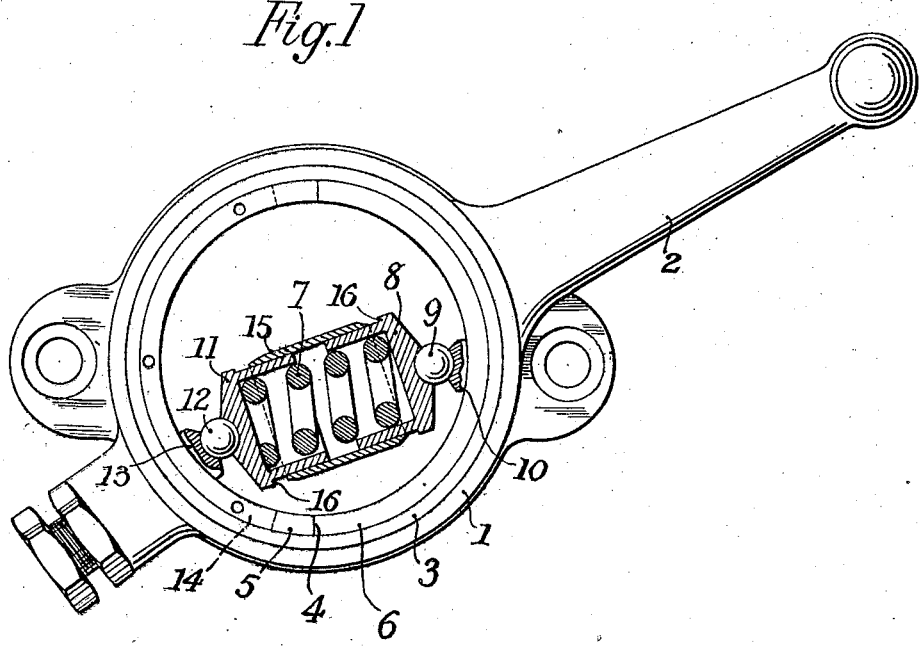
Figure 2:
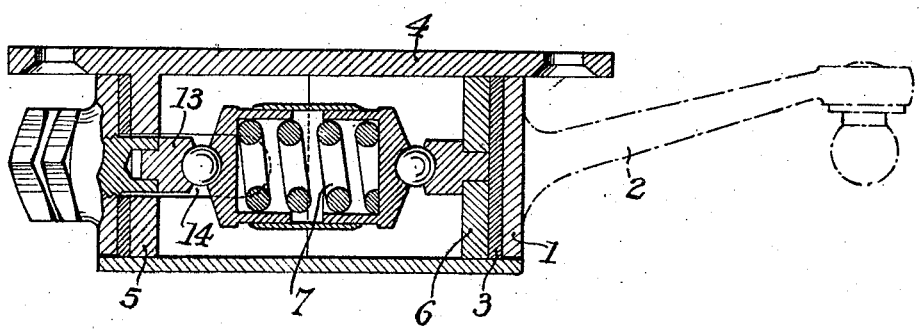

Figs. 1 and 2 relate to the first embodiment. Fig. 1 is a front view with the cover removed and Fig. 2 is a cross section.

Figure 3:
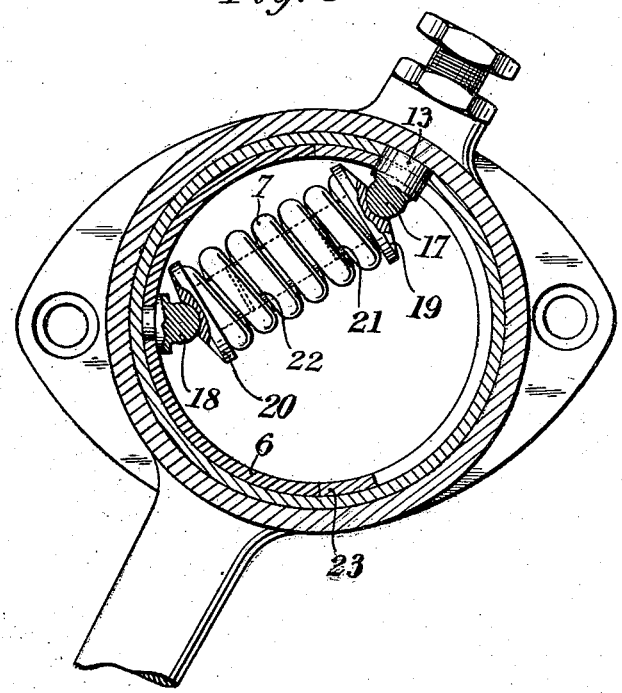
Figure 4:
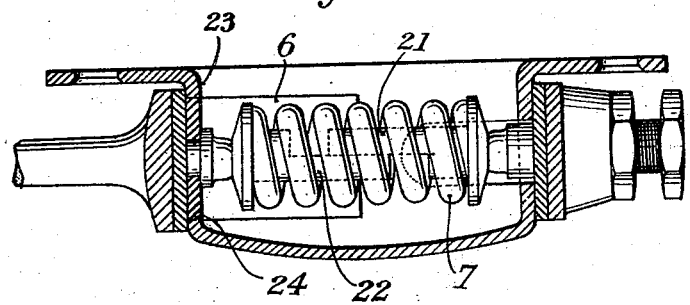

Figs. 3 and 4 are analogous views, relating to a modification.

In Figs. 1 and 2, the apparatus comprises the cylindrical casing 1 secured to the lever 2 whose outer end is secured for instance to the vehicle axle. The said casing is provided in the interior with the facing 3 and is rotatable on the hub 4 which is secured to the vehicle frame; said hub comprises the stationary half-ring 5 and the radially movable half-ring or segment 6 which serves as a friction shoe. A spring 7 is caused to bear upon the middle of the segment through the medium of a cup 8, a ball 9 and a step bearing 10. The other end of the spring is caused to bear through the medium of a cup 11, a ball 12 and a step bearing 13 upon a suitable point of the casing 1.

To provide for the displacements of the said casing relatively to the said hub, the half-ring 5 comprises an aperture 14 in which the said step bearing is free to move; said bearing is formed by the end of a screw engaged in the casing 1, so that the pressure of the spring 7 can be regulated when the apparatus is inoperative. I prefer to give this pressure a value which is just sufficient in order that in this normal position of the apparatus the spring will be held in place and the ring 6 will exercise no pressure on the casing 1.

To prevent the spring from leaving the cups 8 and 11 when it is compressed to the maximum, I may provide a socket 15 in which the said cups are slidable and which is maintained by the shoulders 16 formed on the said cups.

The shock absorber acts preferably in the dry state, and due to the small thickness of the casing the heat from the friction can readily escape. It is an easy matter to take up the wear by acting from the exterior upon the said step bearing. The braking can be modified by changing the said spring.

In the modification shown in Figs. 3 and 4, the ball 9 and the bearing 10 are replaced by a ball portion 18; the ball 12 is eliminated, and the bearing 13 ends in a ball portion 17. Each of the said ball portions are engaged in the members provided with shoulders 19 and 20 upon which the spring 7 is mounted. To properly guide the spring, the said members are terminated by the respective parts 21 and 22 which are slotted for half of their length and are slidable in one another. To simplify the construction, the said hub consists of a stamped cup 23 apertured at 24 for the insertion of the movable half-ring.

It should be noted that the part of the said casing which is available for braking purposes may comprise a circular arc of greater or less size, its length depending upon the length of the friction segment 6, which is not necessarily semicircular.

In the embodiments herein represented, it is supposed that in the mean position or the position of static equilibrium of the lever 2, the spring 7 is situated on a diameter of the casing, so that for symmetrical positions of the lever above and below the horizontal, the spring 7 is equally compressed and produces a like braking effect. In practice it may prove useful to dispose the contact points of the spring so that in the position of static equilibrium of the lever 2 and of the casing secured thereto, the axis of the spring is more or less spaced from the centre of the casing so that the braking effects due to the equal angular displacements of the lever 2 will be different according as such displacements are produced above or below the position of equilibrium, thus offering the best regulation of the accelerations during the periods in which the device returns to this position.

Having thus described my apparatus what I claim as new therein, and my own invention, is:—

1. In a shock absorber for vehicle suspensions, the combination of a hub, a drum adapted to revolve on the said hub, the said two organs being adapted to be respectively connected to the vehicle frame and to one of the suspension parts of the vehicle, a shoe disposed within the said drum and adapted to rub on the inner wall of the latter, an elastic organ disposed within the said drum and bearing, on the said shoe and, on the other hand, on the said drum, the friction surface of the shoe and of the drum and the bearing of the said elastic organ on the said drum being placed on either side of the center of the curvature of the friction surface of the said drum.

2. In a shock absorber for vehicle suspensions, the combination of a hub, a drum loosely revoluble on the said hub, the said two organs being adapted to be connected respectively to the vehicle frame and to one of the suspension parts of the vehicle, a stationary half-ring upon the said hub and disposed within the said drum so as to rub on the inner wall of the latter, a half-ring radially movable and disposed within the said drum so as to rub on the inner wall of the latter, an elastic organ disposed within the said half-rings and bearing on the one hand against the said radially movable ring and on the other hand against the inner wall of the said drum which rubs on the said stationary half-ring.

3. In a shock absorber for vehicle suspensions, the combination of a hub, a drum loosely revoluble on the said hub, the said two organs being adapted to be connected respectively to the vehicle frame and to one of the suspension parts of the vehicle, a stationary half-ring upon the said hub and disposed within the said drum so as to rub on the inner wall of the latter, a half-ring radially movable and disposed within the said drum so as to rub on the inner wall of the latter, a friction facing interposed between the said half-rings and the said drum, a joint on the inner wall of the said radially movable half-ring, a joint on the inner wall of the said drum which rubs on the said stationary half-ring, the said stationary half-ring having an elongated aperture, through which passes the said joint of the said drum, and an elastic organ adapted to bear upon the said joints.

4. In a shock absorber for vehicle suspensions, the combination of a hub, a drum loosely revoluble on the said hub, the said two organs being adapted to be connected respectively to the vehicle frame and to one of the suspension parts of the vehicle, a stationary half-ring upon the said hub and disposed within the said drum so as to rub on the inner wall of the latter, a half-ring radially movable and disposed within the said drum so as to rub on the inner wall of the latter, a friction facing interposed between the said half-rings and the said drum, a joint on the inner wall of the said radially movable half-ring, a joint on the inner wall of the said drum which rubs on the said stationary half-ring, the said stationary half-ring having an elongated aperture, through which passes the said joint of the said drum, an elastic organ adapted to bear upon the said joints, a cylindrical cup upon each of the said joints, the said cups being adapted to lodge the said elastic organ and a guiding socket into which the said cups may slide.

5. In a shock absorber for vehicle suspensions, the combination of a hub, a drum loosely revoluble on the said hub, the said two organs being adapted to be connected respectively to the vehicle frame and to one of the suspension parts of the vehicle, a stationary half-ring upon the said hub and disposed within the said drum so as to rub on the inner wall of the latter, a half-ring radially movable and disposed within the said drum so as to rub on the inner wall of the latter, a friction facing interposed between the said half-rings and the said drum, a joint on the inner wall of the said radially movable half-ring, a screw radially engaged in the drum portion which rubs on the said stationary half-ring, a joint at the inner end of the said screw, the said stationary half-ring having an elongated aperture through which passes the said screw and a spring compressed between the said joints, the said screw being intended to adjust the compression of the said spring.

In testimony whereof I have hereunto affixed my signature.

PIERRE PESTOURIE.